United States Patent
Du et al.

(10) Patent No.: US 10,455,141 B2
(45) Date of Patent: Oct. 22, 2019

(54) AUTO-FOCUS METHOD AND APPARATUS AND ELECTRONIC DEVICE

(71) Applicant: Huawei Technologies Co., Ltd., Shenzhen (CN)

(72) Inventors: Cheng Du, Beijing (CN); Jin Wu, Shenzhen (CN); Wei Luo, Shanghai (CN); Bin Deng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/142,996

(22) Filed: Sep. 26, 2018

(65) Prior Publication Data

US 2019/0028631 A1  Jan. 24, 2019

Related U.S. Application Data

(63) Continuation of application No. 15/515,311, filed as application No. PCT/CN2014/088003 on Sep. 30, 2014, now Pat. No. 10,129,455.

(51) Int. Cl.
*H04N 5/232* (2006.01)
*G03B 13/36* (2006.01)
(Continued)

(52) U.S. Cl.
CPC .......... *H04N 5/23212* (2013.01); *G02B 7/09* (2013.01); *G02B 7/38* (2013.01); *G03B 13/36* (2013.01);
(Continued)

(58) Field of Classification Search
CPC .... H04N 5/23212; H04N 5/2258; G06T 7/55; G06T 7/73; G02B 7/09; G02B 7/38; G03B 13/36
(Continued)

(56) References Cited

U.S. PATENT DOCUMENTS

| 4,185,191 A | 1/1980 | Stauffer |
| 8,284,294 B2 | 10/2012 | Kohama |

(Continued)

FOREIGN PATENT DOCUMENTS

| CN | 101025546 A | 8/2007 |
| CN | 101813867 A | 8/2010 |

(Continued)

OTHER PUBLICATIONS

Machine Translation and Abstract of Chinese Publication No. CN101025546, Aug. 29, 2007, 18 pages.

(Continued)

*Primary Examiner* — Sinh Tran
*Assistant Examiner* — Zhenzhen Wu
(74) *Attorney, Agent, or Firm* — Conley Rose, P.C.

(57) ABSTRACT

An auto-focus method including at a same moment, collecting a first image of a first object using a first image shooting unit, collecting a second image of the first object using a second image shooting unit, calculating M pieces of first depth information of M same feature point pairs in corresponding areas in the first image and the second image, determining whether confidence of the M pieces of first depth information is greater than a threshold, obtaining focusing depth information according to N pieces of first depth information in the IM pieces of first depth information when the confidence of the M pieces of first depth information is greater than the threshold, obtaining a target position of a first lens of the first image shooting unit according to the focusing depth information, and controlling the first lens to move to the target position.

17 Claims, 4 Drawing Sheets

(51) Int. Cl.
*G06T 7/73* (2017.01)
*G06T 7/55* (2017.01)
*G02B 7/09* (2006.01)
*G02B 7/38* (2006.01)
*H04N 5/225* (2006.01)
*G03B 19/02* (2006.01)

(52) U.S. Cl.
CPC ............... *G06T 7/55* (2017.01); *G06T 7/73* (2017.01); *H04N 5/2258* (2013.01); *G03B 19/023* (2013.01); *G06T 2207/10012* (2013.01); *G06T 2207/10028* (2013.01); *G06T 2207/30201* (2013.01)

(58) Field of Classification Search
USPC ........................................ 348/348, 349, 350
See application file for complete search history.

(56) References Cited

U.S. PATENT DOCUMENTS

| | | | |
|---|---|---|---|
| 8,903,233 B1* | 12/2014 | Huang | G03B 13/36 396/104 |
| 9,565,416 B1* | 2/2017 | Lewkow | H04N 5/23212 |
| 2007/0036427 A1 | 2/2007 | Nakamura et al. | |
| 2007/0201851 A1 | 8/2007 | Misawa et al. | |
| 2008/0218612 A1 | 9/2008 | Border et al. | |
| 2010/0328432 A1 | 12/2010 | Tanaka | |
| 2011/0075018 A1 | 3/2011 | Kohama | |
| 2011/0150447 A1 | 6/2011 | Li | |
| 2012/0002841 A1 | 1/2012 | Aratani et al. | |
| 2012/0249816 A1 | 10/2012 | Li et al. | |
| 2013/0142386 A1 | 6/2013 | Li et al. | |
| 2013/0321587 A1 | 12/2013 | Kim et al. | |
| 2014/0176777 A1 | 6/2014 | Lu | |
| 2014/0210953 A1 | 7/2014 | Ego | |
| 2014/0267243 A1 | 9/2014 | Venkataraman et al. | |
| 2014/0307054 A1* | 10/2014 | Chang | H04N 5/23212 348/47 |
| 2014/0327743 A1* | 11/2014 | Chou | H04N 13/0242 13/242 |
| 2014/0368936 A1* | 12/2014 | Hu | G02B 27/646 359/824 |
| 2015/0009299 A1 | 1/2015 | Izawa | |
| 2015/0163478 A1* | 6/2015 | Geiss | H04N 13/243 348/47 |
| 2015/0201182 A1* | 7/2015 | Chang | H04N 5/23212 348/47 |
| 2015/0215607 A1 | 7/2015 | Chou et al. | |
| 2017/0223256 A1 | 8/2017 | Xiao et al. | |
| 2018/0130210 A1 | 5/2018 | Hall | |

FOREIGN PATENT DOCUMENTS

| | | |
|---|---|---|
| CN | 102999939 A | 3/2013 |
| CN | 103905709 A | 7/2014 |
| CN | 103986876 A | 8/2014 |
| JP | 2007232793 A | 9/2007 |
| JP | 2012013514 A | 1/2012 |
| KR | 20110015208 A | 2/2011 |
| WO | 2013046833 A1 | 4/2013 |
| WO | 2013089386 A1 | 6/2013 |
| WO | 2013146996 A1 | 10/2013 |
| WO | 2014044126 A1 | 3/2014 |

OTHER PUBLICATIONS

Machine Translation and Abstract of Chinese Publication No. CN101813867, Aug. 25, 2010, 8 pages.
Machine Translation and Abstract of Chinese Publication No. CN102999939, Mar. 27, 2013, 21 pages.
Machine Translation and Abstract of International Publication No. WO2014044126, Mar. 27, 2014, 15 pages.
Foreign Communication From a Counterpart Application, European Application No. 14903347.4, Extended European Search Report dated Jul. 6, 2017, 7 pages.
Foreign Communication From a Counterpart Application, Chinese Application No. 201480040010.6, Chinese Office Action dated Feb. 14, 2018, 5 pages.
Foreign Communication From a Counterpart Application, PCT Application No. PCT/CN2014/088003, English Translation of International Search Report dated Jun. 30, 2015, 2 pages.
Foreign Communication From a Counterpart Application, PCT Application No. PCT/CN2014/088003, English Translation of Written Opinion dated Jun. 30, 2015, 9 pages.
Machine Translation and Abstract of Korean Publication No. KR20110015208, dated Feb. 15, 2011, 10 pages.
Foreign Communication From a Counterpart Application, Korean Application No. 2019-050359604, Korean Notice of Allowance dated Jul. 12, 2019, 2 pages.

* cited by examiner

AUTO-FOCUS METHOD AND APPARATUS AND ELECTRONIC DEVICE

CROSS-REFERENCE TO RELATED APPLICATIONS

This application is a continuation of U.S. patent application Ser. No. 15/515,311, filed on Mar. 29, 2017, which is a National Stage of International Application No. PCT/CN2014/088003 filed on Sep. 30, 2014. The aforementioned patent applications are hereby incorporated by reference in their entireties.

TECHNICAL FIELD

This application relates to the field of electronic technologies, and in particular, to an auto-focus method and apparatus, and an electronic device.

BACKGROUND

Auto-focus refers to controlling a distance from a lens to an image sensor using an auto-focus algorithm such that a subject of a to-be-photographed object reaches a clearest state.

Commonly used focus algorithms may be classified into two types, active focusing (a distance measurement method) and passive focusing (a hill climbing method). In active focusing, a distance from a photographed subject to a lens is measured using a method such as infrared distance measurement, ultrasonic distance measurement, and binocular stereoscopic vision, a lens position corresponding to an object distance is calculated, and the lens position is adjusted to obtain an image in focus. In passive focusing, images with different focal lengths are obtained by changing focal lengths, definition and change trends of the images are analyzed, an optimal focal length is found, to obtain an image in focus. Currently, a passive focusing solution is widely used in an electronic device such as a smartphone.

A speed of active focusing is fast, but in a specific scenario, a focusing failure rate is high. Precision of passive focusing is high, but a focusing speed is slow.

SUMMARY

Embodiments of this application provide an auto-focus method and apparatus, and an electronic device to improve focusing precision of active focusing.

A first aspect of this application provides an auto-focus method, including collecting a first image of a first object using a first image shooting unit, and at a same moment, collecting a second image of the first object using a second image shooting unit, calculating M pieces of first depth information of NM same feature point pairs in corresponding areas in the first image and the second image, where M is a positive integer, determining whether confidence of the M pieces of first depth information is greater than a threshold, obtaining focusing depth information according to N pieces of first depth information in the M pieces of first depth information when the confidence of the M pieces of first depth information is greater than the threshold, where N is a positive integer less than or equal to M, and obtaining a target position of a first lens of the first image shooting unit according to the focusing depth information, and controlling the first lens to move to the target position.

With reference to the first aspect, in a first possible implementation manner of the first aspect, the corresponding areas are areas corresponding to positions of focus windows when the first image and the second image are collected, an area in the first image is a first area, an area in the second image is a second area, and determining whether confidence of the M pieces of first depth information is greater than a threshold includes determining whether a quantity of first feature points in the first area is greater than or equal to a first threshold or determining whether a quantity of second feature points in the second area is greater than or equal to a second threshold, and determining that the confidence of the M pieces of first depth information is less than or equal to the threshold when the quantity of first feature points is less than the first threshold and/or the quantity of second feature points is less than the second threshold.

With reference to the first possible implementation manner of the first aspect, in a second possible implementation manner of the first aspect, when the quantity of first feature points is greater than or equal to the first threshold and the quantity of second feature points is greater than or equal to the second threshold, the method further includes searching, for the first feature points, the second feature points in a first sequence for first matching feature points that match the first feature points, and searching the second feature points in a second sequence for second matching feature points that match the first feature points, where the second sequence is reverse to the first sequence, determining a quantity of same matching feature points in the first matching feature points and the second matching feature points and corresponding to a same feature point in the first feature points, and determining that the confidence of the M pieces of first depth information is less than or equal to the threshold when a proportion of the quantity to the quantity of first feature points is less than a third threshold, or determining that the confidence of the M pieces of first depth information is greater than the threshold when a proportion of the quantity to the quantity of first feature points is greater than or equal to a third threshold.

With reference to the second possible implementation manner of the first aspect, in a third possible implementation manner of the first aspect, obtaining focusing depth information according to N pieces of first depth information in the M pieces of first depth information includes obtaining the focusing depth information according to depth information corresponding to the same feature point.

With reference to the first aspect or any one of the first possible implementation manner of the first aspect to the third possible implementation manner of the first aspect, in a fourth possible implementation manner of the first aspect, after controlling the first lens to move to the target position, the method further includes controlling a second lens of the second image shooting unit to move to a third position, determining that a check on the focusing depth information succeeds when a first contrast of an image obtained before the first lens moves to the target position and in a focus window area is less than a second contrast of an image obtained when the first lens is at the target position and in a focus window area, and a third contrast of an image obtained when the second lens is at the third position and in a focus window area is less than the second contrast, and performing image shooting at the target position.

With reference to the first aspect or any one of the first possible implementation manner of the first aspect to the third possible implementation manner of the first aspect, in a fifth possible implementation manner of the first aspect, before controlling the first lens to move to the target position, the method further includes determining that a check on the focusing depth information is successful.

With reference to the fifth possible implementation manner of the first aspect, in a sixth possible implementation manner of the first aspect, when a human face is detected in the focus window, the check is performed on the focusing depth information using the following steps. Estimating an estimated distance between the human face and the first lens according to a size of a human face frame, and determining that the check on the focusing depth information is successful when an absolute value of a difference between the estimated distance and the focusing depth information is less than or equal to a fourth threshold.

With reference to any one of the fourth possible implementation manner of the first aspect to the sixth possible implementation manner of the first aspect, in a seventh possible implementation manner of the first aspect, when the confidence of the M pieces of first depth information is less than or equal to the threshold or the check fails, the method further includes controlling the first lens and the second lens of the second image shooting unit to move to new positions, collecting, at the new positions and at a same time, a third image and a fourth image that are of the first object respectively using the first image shooting unit and the second image shooting unit, calculating P pieces of second depth information of P same feature point pairs in corresponding areas in the third image and the fourth image, where P is a positive integer, determining whether confidence of the P pieces of second depth information is greater than the threshold, obtaining new focusing depth information according to L pieces of second depth information in the P pieces of second depth information when the confidence of the P pieces of second depth information is greater than the threshold, where L is a positive integer less than or equal to P, obtaining a new target position of the first lens according to the new focusing depth information, and controlling the first lens to move to the new target position.

With reference to the first aspect, any one of the first possible implementation manner of the first aspect to the third possible implementation manner of the first aspect, the fifth possible implementation manner of the first aspect, or the sixth possible implementation manner of the first aspect, in an eighth possible implementation manner of the first aspect, when the first lens is controlled to move to the target position, the method further includes controlling a second lens of the second image shooting unit to move to a position corresponding to the target position.

A second aspect of this application provides an auto-focus apparatus, including an acquiring unit configured to obtain a first image of a first object and collected using a first image shooting unit, and a second image of the first object and collected using a second image shooting unit, where the first image and the second image are collected at a same moment, and a processing unit configured to calculate M pieces of first depth information of M same feature point pairs in corresponding areas in the first image and the second image, where M is a positive integer, determine whether confidence of the M pieces of first depth information is greater than a threshold, obtain focusing depth information according to N pieces of first depth information in the M pieces of first depth information when the confidence of the M pieces of first depth information is greater than the threshold, where N is a positive integer less than or equal to M, obtain a target position of a first lens of the first image shooting unit according to the focusing depth information, and control the first lens to move to the target position.

With reference to the second aspect, in a first possible implementation manner of the second aspect, the corresponding areas correspond to positions of focus windows when the first image and the second image are collected, an area in the first image is a first area, an area in the second image is a second area, and the processing unit is further configured to determine whether a quantity of first feature points in the first area is greater than or equal to a first threshold or determine whether a quantity of second feature points in the second area is greater than or equal to a second threshold, and determine that the confidence of the M pieces of first depth information is less than or equal to the threshold when the quantity of first feature points is less than the first threshold and/or the quantity of second feature points is less than the second threshold.

With reference to the first possible implementation manner of the second aspect, in a second possible implementation manner of the second aspect, the processing unit is further configured to search, for the first feature points, the second feature points in a first sequence for first matching feature points that match the first feature points, and search the second feature points in a second sequence for second matching feature points that match the first feature points when the quantity of first feature points is greater than or equal to the first threshold and the quantity of second feature points is greater than or equal to the second threshold, where the second sequence is reverse to the first sequence, determine a quantity of same matching feature points in the first matching feature points and the second matching feature points and corresponding to a same feature point in the first feature points, and determine that the confidence of the M pieces of first depth information is less than or equal to the threshold when a proportion of the quantity to the quantity of first feature points is less than a third threshold, or determine that the confidence of the M pieces of first depth information is greater than the threshold when a proportion of the quantity to the quantity of first feature points is greater than or equal to a third threshold.

With reference to the second possible implementation manner of the second aspect, in a third possible implementation manner of the second aspect, the processing unit is further configured to obtain the focusing depth information according to depth information corresponding to the same feature point.

With reference to the second aspect or any one of the first possible implementation manner of the second aspect to the third possible implementation manner of the second aspect, in a fourth possible implementation manner of the second aspect, the processing unit is further configured to control a second lens of the second image shooting unit to move to a third position after controlling the first lens to move to the target position, determine that a check on the focusing depth information succeeds when a first contrast of an image obtained before the first lens moves to the target position and in a focus window area is less than a second contrast of an image obtained when the first lens is at the target position, and a third contrast of an image obtained when the second lens is at the third position and in a focus window area is less than the second contrast, and control performing image shooting at the target position.

With reference to the second aspect or any one of the first possible implementation manner of the second aspect to the third possible implementation manner of the second aspect, in a fifth possible implementation manner of the second aspect, the processing unit is further configured to determine that a check on the focusing depth information is successful before controlling the first lens to move to the target position.

With reference to the fifth possible implementation manner of the second aspect, in a sixth possible implementation manner of the second aspect, the processing unit is further configured to estimate an estimated distance between a human face and the first lens according to a size of a human face frame when the human face is detected in the focus window, and determine that the check on the focusing depth information is successful when an absolute value of a difference between the estimated distance and the focusing depth information is less than or equal to a fourth threshold.

With reference to any one of the fourth possible implementation manner of the second aspect to the sixth possible implementation manner of the second aspect, in a seventh possible implementation manner of the second aspect, the processing unit is further configured to control the first lens and the second lens of the second image shooting unit to move to new positions when the confidence of the M pieces of first depth information is less than or equal to the threshold or the check fails. The acquiring unit is further configured to obtain, at the new positions, a third image and a fourth image that are of the first object and collected at a same time respectively using the first image shooting unit and the second image shooting unit, and the processing unit is further configured to calculate P pieces of second depth information of N same feature point pairs in corresponding areas in the third image and the fourth image, where P is a positive integer, determine whether confidence of the P pieces of second depth information is greater than the threshold, obtain new focusing depth information according to L pieces of second depth information in the P pieces of second depth information when the confidence of the P pieces of second depth information is greater than the threshold, where L is a positive integer less than or equal to P, obtain a new target position of the first lens according to the new focusing depth information, and control the first lens to move to the new target position.

With reference to the second aspect, any one of the first possible implementation manner of the second aspect to the third possible implementation manner of the second aspect, the fifth possible implementation manner of the second aspect, or the sixth possible implementation manner of the second aspect, in an eighth possible implementation manner of the second aspect, the processing unit is further configured to control a second lens of the second image shooting unit to move to a position corresponding to the target position when controlling the first lens to move to the target position.

A third aspect of this application provides an electronic device, including a first image shooting unit and a second image shooting unit configured to respectively collect, at a same moment, a first image and a second image that are of a first object, a first actuator, and a processor configured to calculate M pieces of first depth information of M same feature point pairs in corresponding areas in the first image and the second image, where M is a positive integer, determine whether confidence of the M pieces of first depth information is greater than a threshold, obtain focusing depth information according to N pieces of first depth information in the M pieces of first depth information when the confidence of the M pieces of first depth information is greater than the threshold, where N is a positive integer less than or equal to M, obtain a target position of a first lens of the first image shooting unit according to the focusing depth information, and control the first actuator to move such that the first lens moves to the target position.

With reference to the third aspect, in a first possible implementation manner of the third aspect, the corresponding areas correspond to positions of focus windows when the first image and the second image are collected, an area in the first image is a first area, an area in the second image is a second area, and the processor is further configured to determine whether a quantity of first feature points in the first area is greater than or equal to a first threshold or determine whether a quantity of second feature points in the second area is greater than or equal to a second threshold, and determine that the confidence of the M pieces of first depth information is less than or equal to the threshold when the quantity of first feature points is less than the first threshold and/or the quantity of second feature points is less than the second threshold.

With reference to the first possible implementation manner of the third aspect, in a second possible implementation manner of the third aspect, the processor is further configured to search, for the first feature points, the second feature points in a first sequence for first matching feature points that match the first feature points, and search the second feature points in a second sequence for second matching feature points that match the first feature points when the quantity of first feature points is greater than or equal to the first threshold and the quantity of second feature points is greater than or equal to the second threshold, where the second sequence is reverse to the first sequence, determine a quantity of same matching feature points in the first matching feature points and the second matching feature points and corresponding to a same feature point in the first feature points, and determine that the confidence of the M pieces of first depth information is less than or equal to the threshold when a proportion of the quantity to the quantity of first feature points is less than a third threshold, or determine that the confidence of the M pieces of first depth information is greater than the threshold when a proportion of the quantity to the quantity of first feature points is greater than or equal to a third threshold.

With reference to the second possible implementation manner of the third aspect, in a third possible implementation manner of the third aspect, the processor is further configured to obtain the focusing depth information according to depth information corresponding to the same feature point.

With reference to the third aspect or any one of the first possible implementation manner of the third aspect to the third possible implementation manner of the third aspect, in a fourth possible implementation manner of the third aspect, the electronic device further includes a second actuator, and the processor is further configured to control the second actuator to move in order to move a second lens of the second image shooting unit to a third position after controlling the first lens to move to the target position, determine that a check on the focusing depth information succeeds when a first contrast of an image obtained before the first lens moves to the target position and in a focus window area is less than a second contrast of an image obtained when the first lens is at the target position and in a focus window area, and a third contrast of an image obtained when the second lens is at the third position and in a focus window area is less than the second contrast, and control performing image shooting at the target position.

With reference to the third aspect or any one of the first possible implementation manner of the third aspect to the third possible implementation manner of the third aspect, in a fifth possible implementation manner of the third aspect, the processor is further configured to determine that a check on the focusing depth information is successful before controlling the first lens to move to the target position.

With reference to the fifth possible implementation manner of the third aspect, in a sixth possible implementation manner of the third aspect, the processor is further configured to estimate an estimated distance between a human face and the first lens according to a size of a human face frame when the human face is detected in the focus window, and determine that the check on the focusing depth information is successful when an absolute value of a difference between the estimated distance and the focusing depth information is less than or equal to a fourth threshold.

With reference to any one of the fourth possible implementation manner of the third aspect to the sixth possible implementation manner of the third aspect, in a seventh possible implementation manner of the third aspect, the processor is further configured to control the first lens and the second lens of the second image shooting unit to move to new positions when the confidence of the M pieces of first depth information is less than or equal to the threshold or the check fails, and at the new positions, a third image and a fourth image that are of the first object and collected at a same time using the first image shooting unit and the second image shooting unit, and the processor is further configured to calculate P pieces of second depth information of N same feature point pairs in corresponding areas in the third image and the fourth image, where P is a positive integer, determine whether confidence of the P pieces of second depth information is greater than the threshold, obtain new focusing depth information according to L pieces of second depth information in the P pieces of second depth information when the confidence of the P pieces of second depth information is greater than the threshold, where L is a positive integer less than or equal to P, obtain a new target position of the first lens according to the new focusing depth information, and control the first lens to move to the new target position.

With reference to the third aspect, any one of the first possible implementation manner of the third aspect to the third possible implementation manner of the third aspect, the fifth possible implementation manner of the third aspect, or the sixth possible implementation manner of the third aspect, in an eighth possible implementation manner of the third aspect, the processor is further configured to control a second lens of the second image shooting unit to move to a position corresponding to the target position when controlling the first lens to move to the target position.

One or more technical solutions provided in the embodiments of this application have at least the following technical effects or advantages.

In the embodiments of this application, at a same moment, a first image of a first object is collected using a first image shooting unit, and a second image of the first object is collected using a second image shooting unit, M pieces of first depth information of M same feature point pairs in corresponding areas in the first image and the second image are calculated, it is determined whether confidence of the M pieces of first depth information is greater than a threshold, focusing depth information is obtained according to N pieces of first depth information in the M pieces of first depth information when the confidence of the M pieces of first depth information is greater than the threshold. Then, a target position of a first lens is obtained according to the focusing depth information, and the first lens is controlled to move to the target position. Therefore, in the embodiments, confidence of an object distance obtained in active focusing, that is, the M pieces of first depth information is determined. An active focusing method is used only when the confidence is greater than the threshold, that is, focusing depth information is obtained according to N pieces of first depth information in the M pieces of first depth information. Then, the target position of the first lens is obtained according to the focusing depth information, and then the first lens is controlled to move to the target position to complete focusing. Therefore, in comparison with an active focusing method in the prior art, focusing precision is improved.

DESCRIPTION OF EMBODIMENTS

Embodiments of this application provide an auto-focus method and apparatus, and an electronic device to improve focusing precision of active focusing.

To make the objectives, technical solutions, and advantages of the embodiments of this application clearer, the following clearly describes the technical solutions in the embodiments of this application with reference to the accompanying drawings in the embodiments of this application. The described embodiments are merely some but not all of the embodiments of this application. All other embodiments obtained by persons of ordinary skill in the art based on the embodiments of this application without creative efforts shall fall within the protection scope of this application.

Figure 1:
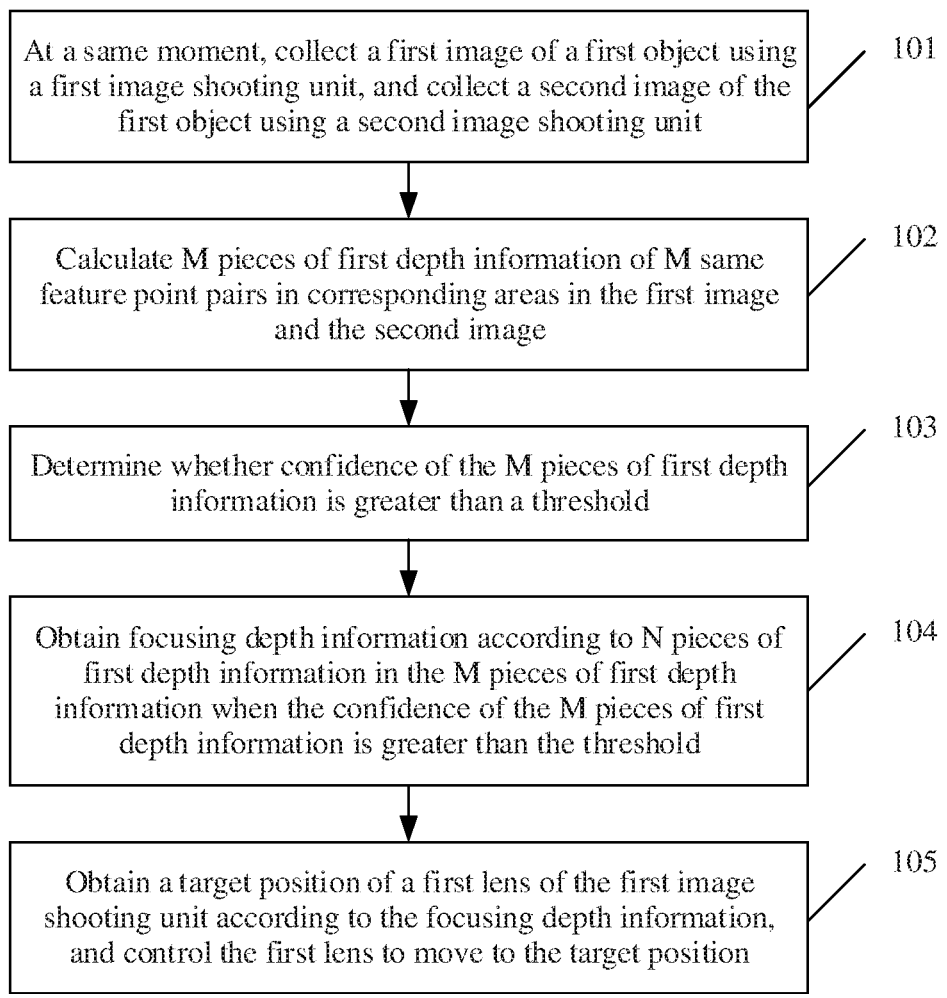
FIG. 1 is a flowchart of an auto-focus method according to an embodiment of this application.

First, an implementation process of an auto-focus method in an embodiment of this application is described. Referring to FIG. 1, FIG. 1 is a flowchart of the auto-focus method in this embodiment, and the method includes the following content.

Step 101: At a same moment, collect a first image of a first object using a first image shooting unit (e.g. a first camera), and collect a second image of the first object using a second image shooting unit (e.g. a second camera).

Optionally, parameters of the first image shooting unit and the second image shooting unit are the same. For example, the first image shooting unit and the second image shooting unit may also have a same focal length and same image sensors. Certainly, the first image shooting unit and the second image shooting unit may also have same lenses and another same hardware parameter.

It should be noted that, that the first image shooting unit and the second image shooting unit have one same parameter may be understood as that parameters of the first image shooting unit and the second image shooting unit are the same. Certainly, that the first image shooting unit and the second image shooting unit have multiple same parameters (for example, two or three same parameters) may also be understood as that parameters of the first image shooting unit and the second image shooting unit are the same. Preferably, all parameters of the first image shooting unit and the second image shooting unit are the same, that is, the first image shooting unit and the second image shooting unit are two same image shooting units.

The first image shooting unit and the second image shooting unit are disposed on an electronic device. For example, the electronic device is a mobile phone, a tablet computer, or a camera.

Optionally, a first lens of the first image shooting unit and a second lens of the second image shooting unit are disposed on a same side of the electronic device. Preferably, the first lens and the second lens are disposed on a same plane of the electronic device. For example, both of them are disposed on a rear cover of a mobile phone.

Optionally, the first lens may be a front-facing lens, and the second lens is a rear-facing lens. In use, one of the lenses may be flipped to a same side as the other lens.

Preferably, when an image is being obtained, an optical axis of the first image shooting unit is parallel to an optical axis of the second image shooting unit, to ensure that motion between the collected first image and second image is translation motion. In this way, a correction computation amount is small.

Figure 2:
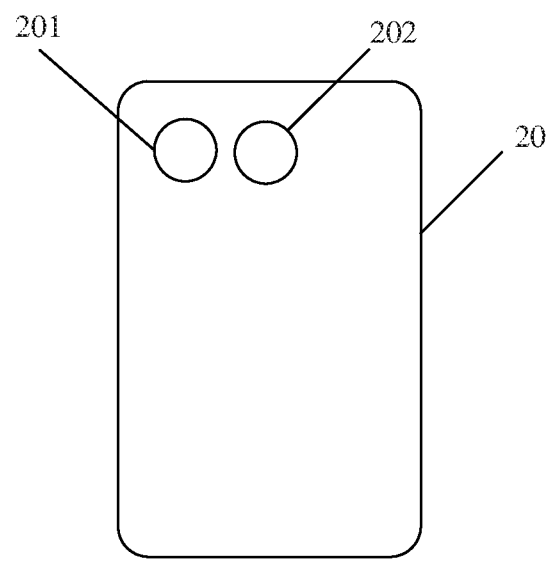
FIG. 2 is a schematic disposing diagram of a lens of an image shooting unit according to an embodiment of this application.

Referring to FIG. 2, FIG. 2 is a possible schematic diagram when a first image shooting unit 201 and a second image shooting unit 202 are disposed on an electronic device 20. The first image shooting unit 201 and the second image shooting unit 202 are disposed on a same side of the electronic device 20. For example, the first image shooting unit 201 and the second image shooting unit 202 are disposed on a rear cover side of the electronic device 20.

When the electronic device 20 is held in hand to take a photo, a first image is photographed using the first image shooting unit 201, and a second image is photographed at a same time using the second image shooting unit 202. Although the first image shooting unit 201 and the second image shooting unit 202 perform photographing on a same object, that is, a first object, a first collection area of the first image shooting unit 201 and a second collection area of the second image shooting unit 202 are not completely the same because there is a distance between an optical axis of the first image shooting unit 201 and that of the second image shooting unit 202 in a horizontal direction. However, there is an overlapped collection area between the first collection area and the second collection area.

Optionally, the electronic device 20 that photographs the first image and the second image and an electronic device that performs steps 102 and 103 may be a same electronic device. Further, the electronic device 20 obtains image signals using image sensors such as a charge-coupled device (CCD) or a complementary metal oxide semiconductor (CMOS) in the first image shooting unit 201 and the second image shooting unit 202, and then transmits these image signals to an image signal processor (ISP). The ISP preprocesses the image signals to obtain the first image and the second image.

Optionally, the electronic device 20 that photographs the first image and the second image may not be a same electronic device as an electronic device that performs steps 102 and 103. For example, the electronic device 20 that photographs the first image and the second image is a mobile phone, a tablet computer, or a single-lens reflex camera, and a photographing process is described as above. The electronic device that performs the step 102 is a notebook computer, another mobile phone, or another tablet computer. In this case, after the first image and the second image are obtained by means of photographing, the first image and the second image are transmitted to the notebook computer, the other mobile phone, or the other tablet computer, and therefore, the notebook computer, the other mobile phone, or the other tablet computer obtains the first image and the second image.

Step 102: Calculate M pieces of first depth information of M same feature point pairs in corresponding areas in the first image and the second image, where M is a positive integer and is less than or equal to a smaller total quantity of pixels in a total quantity of pixels in the first image and a total quantity of pixels in the second image. For example, M is less than or equal to 600×900 if the total quantity of pixels in the first image is 600×1200 and the total quantity of pixels in the second image is 600×900.

In this technical field, depth information indicates a distance between a photographed object and a lens. In this embodiment of this application, the M pieces of first depth information indicate distances separately between the first lens and M positions on the first object corresponding to the feature points.

In this technical field, a feature point is a pixel having a specific feature in an image, and an image feature has a color feature, a texture feature, a shape feature, and a spatial relationship feature. Feature points extracted according to different feature point extraction methods have different features. For example, a corner point (that is, a feature point) extracted using a Harris corner point extraction method is a point at which brightness of a two-dimensional image changes dramatically or a point corresponding to a maximum curvature value on an image edge curve. For another example, a feature point extracted using a feature extraction method of scale-invariant feature transform (SIFT) is a feature vector irrelevant to scale zooming, rotation, and brightness variation. In this embodiment of this application, feature point extraction and calculating depth information of a feature point according to parallax between same feature points are content well known and details are not described herein again.

Optionally, the corresponding areas correspond to positions of focus windows when the first image and the second image are collected. It is assumed that an area in the first image is a first area, and an area in the second image is a second area. Because focusing needs to be performed, accuracy is relatively high and a calculation amount is small when a manner of calculating depth information of the positions of the focus windows is selected. Certainly, in practical application, the corresponding area may also be another area, or may even be an entire image area, which is not limited in this application.

Optionally, first feature points in the first area and second feature points in the second area may be extracted, and then depth information of the feature points, that is, the M pieces of first depth information, may be calculated according to parallax between same feature points in the first feature points and the second feature points.

After the M pieces of first depth information are calculated, step 103 is performed subsequently.

Step 103: Determine whether confidence of the M pieces of first depth information is greater than a threshold.

The confidence represents reliability or precision of depth information.

In an embodiment, determining whether confidence of the M pieces of first depth information is greater than a threshold may be implemented in the following manner. Determining whether a quantity of first feature points is greater than or equal to a first threshold or determining whether a quantity of second feature points is greater than or equal to a second threshold, and when the quantity of first feature points is less than the first threshold and/or the quantity of second feature points is less than the second threshold, determining that the confidence of the M pieces of first depth information is less than or equal to the threshold. It is assumed that there are totally 100 pixels in the first area, but when a quantity of feature points extracted according to a specific feature point extraction method is less than the threshold (for example, the threshold is 30), for example, there are only two feature points, confidence of depth information calculated according to 50 feature points is greater than confidence of depth information calculated according to two feature points. Therefore, confidence of depth information calculated according to the first feature points and the second feature points is relatively low when the quantity of first feature points is less than the first threshold or the quantity of second feature points is less than the second threshold.

Further, there are the following three cases. In the first case, it is determined whether the quantity of first feature points is greater than or equal to the first threshold, it is determined that the confidence of the M pieces of first depth information is less than or equal to the threshold if the quantity of first feature points is less than the first threshold.

In the second case, it is determined whether the quantity of second feature points is greater than or equal to the second threshold, it is determined that the confidence of the M pieces of first depth information is less than or equal to the threshold if the quantity of second feature points is less than the second threshold.

In the third case, it may be determined that the confidence of the M pieces of first depth information is less than or equal to the threshold provided that the quantity of first feature points is less than the first threshold or the quantity of second feature points is less than the second threshold.

Correspondingly, in the first case, when the quantity of first feature points is greater than the first threshold, it may be determined that the confidence of the M pieces of first depth information is greater than the threshold. Optionally, to further confirm that the confidence of the M pieces of first depth information is greater than the threshold, the method further includes searching, for the first feature points, the second feature points in a first sequence for first matching feature points that match the first feature points, and searching the second feature points in a second sequence for second matching feature points that match the first feature points, where the first sequence is reverse to the second sequence, determining a quantity of same matching feature points that are in the first matching feature points and the second matching feature points and that are corresponding to a same feature point in the first feature points, where each pair of same matching feature points corresponds to a same feature point in the first feature points, and determining that the confidence of the M pieces of first depth information is less than or equal to the threshold when a proportion of the quantity to the quantity of first feature points is less than a third threshold, or determining that the confidence of the M pieces of first depth information is greater than the threshold when a proportion of the quantity to the quantity of first feature points is greater than or equal to a third threshold.

Further, the first sequence is a sequence from left to right, and the second sequence is a sequence from right to left. In practical application, the first sequence may also be a sequence from top to bottom, and the second sequence is a sequence from bottom to top.

For example, the first feature points are successively A, B, C, and D from left to right, and the second feature points are successively a, b, c, and d from left to right. For the first feature points, first, the second feature points are searched in a sequence from left to right for the first matching feature points that match the first feature points. It is assumed that a result of searching the second feature point b matches the first feature point B. The first matching feature point is the second feature point b. Then, the second feature points are searched in a sequence from right to left for the second matching feature points that match the first feature points. It is assumed that a result of searching the second feature point b matches the first feature point B, and the second feature point c matches the first feature point C. The second matching feature points are the second feature point b and the second feature point c. It may be seen that the first feature point B matches the second feature point b in both two times of searching, and therefore, the first feature point 13 is a feature point with high confidence, and is referred to as a first sub feature point. In other words, the quantity of same matching feature points in the first matching feature points and the second matching feature points is determined, where each pair of same matching feature points corresponds to a same feature point in the first feature points. The quantity of same matching feature points is also a quantity of first sub feature points.

It is determined that the confidence of the M pieces of first depth information is less than or equal to the threshold when the proportion of the quantity to the quantity of first feature points is less than the third threshold.

It is determined that the confidence of the MN pieces of first depth information is greater than the threshold when the proportion of the quantity to the quantity of first feature points is greater than or equal to the third threshold.

In other words, in this embodiment of this application, when feature point matching can succeed in both of two directions and a quantity of feature point pairs that match successfully is larger, it means that there are more reliable feature points, and confidence of depth information calculated using the feature points is higher. If a quantity of feature pairs that match successfully in both of the two directions is smaller, it means that there are fewer reliable feature points, and confidence of depth information calculated using the feature points is lower.

Corresponding to the foregoing second case, it may be determined that the confidence of the M pieces of first depth information is greater than the threshold when the quantity of second feature points is greater than the first threshold. Optionally, to further confirm that the confidence of the M pieces of first depth information is greater than the threshold, steps same as the foregoing may be performed.

Corresponding to the foregoing third case, the foregoing described step of further confirming that the confidence of the M pieces of first depth information is greater than the threshold is performed when the quantity of first feature points is greater than or equal to the first threshold and when the quantity of second feature points is greater than or equal to the second threshold.

When it is determined, using the foregoing methods, that the confidence of the M pieces of first depth information is greater than the threshold, a step 104 is performed subsequently.

Step 104: Obtain focusing depth information according to N pieces of first depth information in the MN pieces of first depth information when the confidence of the M pieces of first depth information is greater than the threshold, where N is a positive integer less than or equal to M.

In an embodiment, obtaining the focusing depth information according to N pieces of first depth information in the M pieces of first depth information may have multiple implementation manners. Further, in the first implementation manner, a weighted average value of the M pieces of first depth information is used as the focusing depth information. In the second implementation manner, depth information that is significantly different from other depth information may be first excluded from the M pieces of first depth information, and then a weighted average value of remaining first depth information is calculated and used as the focusing depth information. In the third implementation manner, one piece of first depth information is selected from the M pieces of first depth information as the focusing depth information. In the fourth implementation manner, multiple pieces of first depth information are randomly selected from the M pieces of first depth information, and then weighted average calculation is performed to obtain the focusing depth information.

In another embodiment, when the foregoing described method of further confirming whether the confidence of the M pieces of first depth information is greater than the threshold is implemented, obtaining the focusing depth information according to N pieces of first depth information in the M pieces of first depth information includes obtaining the focusing depth information according to depth information corresponding to the same feature point, that is, the first sub feature point. Further, in an embodiment, the focusing depth information is a weighted average value of depth information of all first sub feature points. In another embodiment, a first sub feature point of which depth information is significantly different from a majority of depth information is first excluded, and a weighted average of depth information of remaining first sub feature points is calculated and used as the final focusing depth information. Because the first sub feature point is a feature point with high confidence obtained by means of screening using the foregoing method, accuracy of the focusing depth information calculated according to the depth information corresponding to the first sub feature point is higher.

Step 105: Obtain a target position of a first lens of the first image shooting unit according to the focusing depth information, and control the first lens to move to the target position. Further, the obtaining a target position of a first lens according to the focusing depth information may also have multiple implementation manners. For example, if a correspondence between an object distance and a position of the first lens is stored in an electronic device, the target position corresponding to the focusing depth information may be obtained by querying the correspondence. For another example, obtaining the focusing depth information is equivalent to obtaining an object distance, and therefore, a focal length may be calculated according to the object distance, and further the target position may be obtained.

Optionally, the controlling the first lens to move to the target position may be controlling movement of the first lens by controlling a first actuator, for example, a voice coil motor (VCM). Further, the VCM includes a coil, a magnet set, and a spring plate. The coil is fixed in the magnet set using two spring plates, an upper spring plate and a lower spring plate. The coil generates a magnetic field when the coil is powered on. The magnetic field of the coil interacts with the magnet set, the coil moves upward, and the first lens locked in the coil moves together. The coil returns back to an original position under an elastic force of the spring plate when the coil is powered off.

Certainly, in practical application, further, the first lens may further be drove, by controlling another actuator such as a motor in another form or an associated component, to move to the target position.

Step 105 is similar to active focusing, that is, when the confidence of the M pieces of first depth information is greater than the threshold, the active focusing may be used, which improves focusing precision in a case of ensuring a focusing speed.

Optionally, when the first lens is controlled to move to the target position, the method further includes controlling a second lens of the second image shooting unit to move to a position corresponding to the target position.

Further, the position to which the second lens needs to move may also be further determined in multiple manners. In the first manner, for example, a correspondence between the object distance and a position of the second lens may further be included in the correspondence of the object distance and the position of the first lens. The position to which the second lens needs to move may be obtained by querying the correspondence. In this embodiment, the positions to which the first lens and the second lens need to move may be determined using the target position or the focusing depth information.

In the second manner, the second lens may also be moved to a corresponding position using steps similar to the steps 102 to 105. In this embodiment, processing is separately performed for the two lenses, and processing methods are the same.

Optionally, further, after the first lens moves to the target position, a user may press a shutter to shoot an image. Because focusing is performed, definition of an image area corresponding to the focus window is higher than that of another area. For the second image shooting unit, a principle is the same. After the second lens moves to the position corresponding to the target position, a focused image may also be obtained.

Optionally, after the focusing depth information is obtained, a check may further be performed on the focusing depth information. Image shooting is performed at the target position only after the check succeeds. Steps of the check include controlling the second lens of the second image shooting unit to move to a third position, and determining that the check on the focusing depth information succeeds when a first contrast of an image obtained before the first lens moves to the target position and in a focus window area is less than a second contrast of an image obtained when the first lens is at the target position and in a focus window area, and a third contrast of an image obtained when the second lens is at the third position and in a focus window area is less than the second contrast.

An image contrast refers to an image color difference. In practical application, there are different calculation methods, for example, measurement of different brightness levels between the brightest white area and the darkest black area in an image in a focus window area, a larger difference range represents a larger contrast, and a smaller difference range represents a smaller contrast. Contrast calculation is content well known by persons skilled in the art. Therefore, details are not described herein again.

For example, it is assumed that a position of the first lens before the first lens moves to the target position is P0, and the target position is P1. It is assumed that the third position is P2, and in an embodiment, $P2=(P0+P1)/2$. It is assumed that at the position P0, a contrast of an image obtained by the first image shooting unit and is in the focus window area is a first contrast C(P0). A contrast of an image obtained at the position P1 by the first image shooting unit and is in the focus window area is a second contrast C(P1). A contrast of an image obtained at the position P2 by the second image shooting unit and is in the focus window area is a third contrast C(P2). It is determined that the check on the focusing depth information succeeds when C(P2)<C(P1) and C(P0)<C(P1). It is determined that the check on the focusing depth information fails when C(P2) is greater than or equal to C(P1), or C(P0) is greater than or equal to C(P1).

Optionally, before the first lens is controlled to move to the target position, it may be determined that the check on the focusing depth information is successful. In this embodiment, steps of the check on the focusing depth information include calculating an estimated size of the first object according to a size of the first object in the first image, comparing the estimated size obtained through calculation with prior data, where if an absolute value of a difference between the estimated size and the prior data is greater than a set threshold, it indicates that the check on the focusing depth information fails, and otherwise, the check succeeds. The estimated size of the first object is calculated according to the size of the first object in the first image, and may be further calculated in the following way. Because the size of the first object in the first image, a distance between the image sensor and the first lens, and the M pieces of first depth information are all known, the estimated size of the first object may be obtained through calculation according to an imaging principle and a similar triangle principle. For example, it is assumed that a width of a car is 3 meters, but an estimated size of the car calculated according to a size of the car in the first image is much greater than 3 meters, it means that calculation of the M pieces of first depth information is wrong, and it indicates that the check fails, and otherwise, the check succeeds.

In a scenario of photographing a person, when a human face is detected in the focus window, in addition to the foregoing check methods, the check may further be performed on the focusing depth information using the following steps. Estimating an estimated distance between the human face and the first lens according to a size of a human face frame, and determining that the check on the focusing depth information is successful when an absolute value of a difference between the estimated distance and the focusing depth information is less than or equal to a fourth threshold. Otherwise, the check on the focusing depth information fails. The human face frame represents a position of the human face.

The estimating an estimated distance between the human face and the first lens according to a size of a human face frame is as follows. A quantity of pixels corresponding to the human face frame, that is, a size in the first image, is in a specific proportion to a distance between the human face and the first lens, and then the estimated distance between the human face and the first lens may be estimated according to the proportion and the size of the human face frame. Then, when an absolute value of a difference between the focusing depth information and the estimated distance estimated using this method is less than or equal to the fourth threshold, it means that the check succeeds, and otherwise, the check fails.

Optionally, when the check succeeds, distance measurement method focusing is enabled according to the focusing depth information to directly move the lens to a position of a corresponding depth.

Optionally, regardless of using which of the foregoing check methods or another check method, when the check fails, or the confidence of the M pieces of first depth information is less than or equal to the threshold, the method further includes controlling the first lens and the second lens of the second image shooting unit to move to new positions, collecting, at the new positions and at a same time, a third image and a fourth image that are of the first object respectively using the first image shooting unit and the second image shooting unit, calculating P pieces of second depth information of P same feature point pairs in corresponding areas in the third image and the fourth image, determining whether confidence of the P pieces of second depth information is greater than the threshold, obtaining new focusing depth information according to L second depth information in the P pieces of second depth information when the confidence of the P pieces of second depth information is greater than the threshold, obtaining a new target position of the first lens according to the new focusing depth information, and controlling the first lens to move to the new target position, where P is a positive integer, and L is a positive integer less than or equal to M. Certainly, P is less than or equal to a smaller total quantity of pixels in a total quantity of pixels in the third image and a total quantity of pixels in the fourth image.

Optionally, the first lens and the second lens are moved to the new positions and may be moved in a fixed step length manner, that is, moving amplitude each time is the same. A manner of gradually increasing or gradually decreasing a moving step length may also be used to move the lenses. In practical application, moving may further be performed according to another rule, which is not limited in this application.

An implementation process of remaining steps is similar to that of the foregoing steps represented in FIG. 1, and details are not described herein again.

In this embodiment, it is equivalent to that after a lens is moved each time in passive focusing, depth information is recalculated, and then confidence of the depth information is determined, where when the confidence is high, a manner similar to active focusing is used or a check is performed on the distance. If the confidence is low or the checking fails, the lens is moved again, depth information is recalculated again, and then confidence of the depth information is determined again. This cycle is repeated in this way. Both a speed of active focusing and precision of passive focusing may be ensured using the method in this embodiment.

Figure 3:
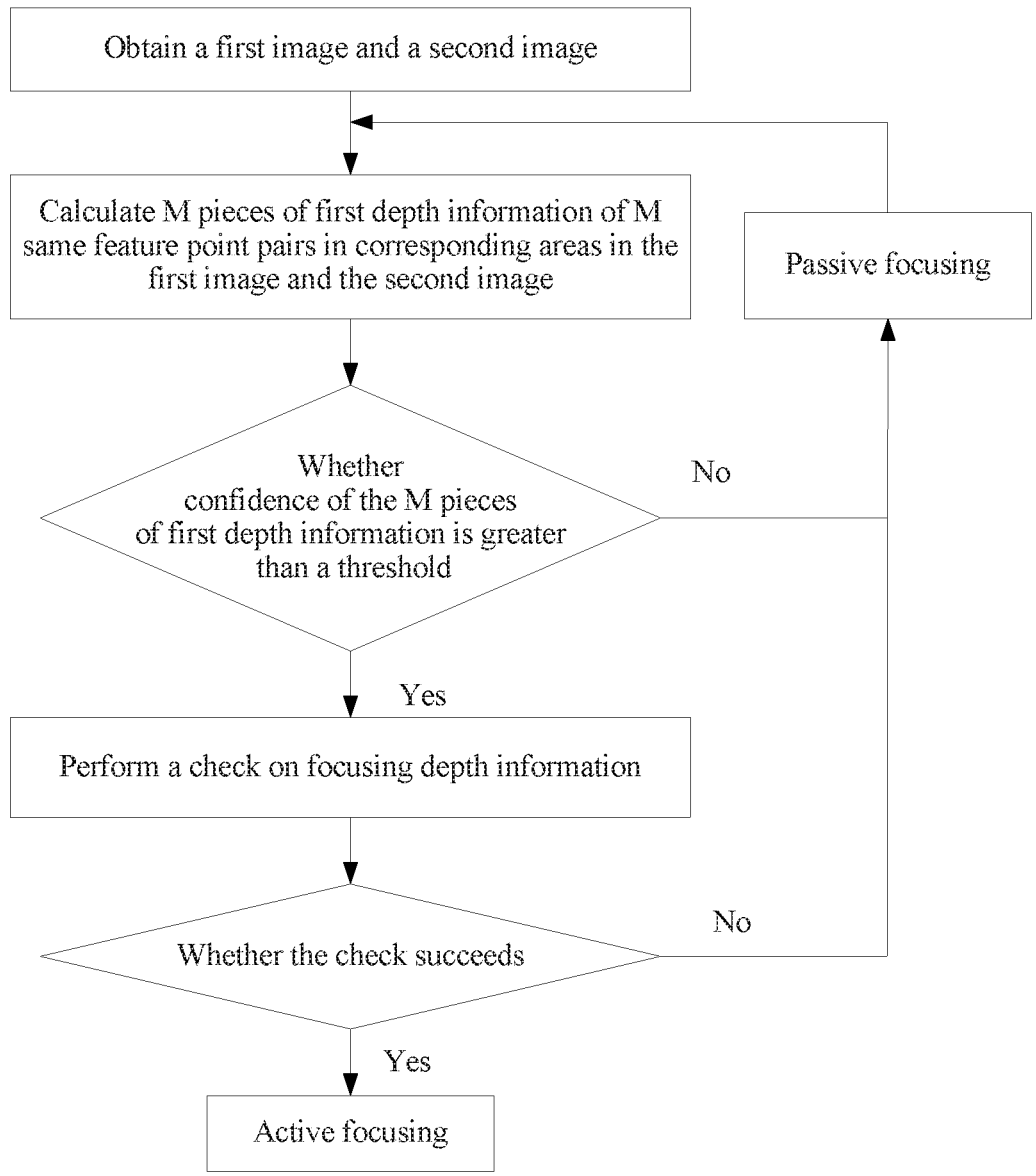
FIG. 3 is an example flowchart diagram of an auto-focus method according to an embodiment of this application.

The following describes a specific example of an autofocus method, and reference may be made to FIG. 3.

First, a first image and a second image are obtained, and further, position information of focus windows when the first image and the second image are photographed is further obtained. Then, M pieces of first depth information of M same feature point pairs in corresponding areas in the first image and the second image are calculated. Further, depth information of same feature points in focus window areas may be calculated and used as the M pieces of first depth information. Then, it is determined whether confidence of the M pieces of first depth information is greater than a threshold. Passive focusing is enabled if the confidence of the M pieces of first depth information is not greater than the threshold. If the confidence of the M pieces of first depth information is greater than the threshold, focusing depth information is obtained according to N pieces of first depth information in the M pieces of first depth information, and a check is performed on the focusing depth information. Then, it is determined whether the check succeeds. If the check fails, the passive focusing is also enabled. If the check succeeds, active focusing is enabled. Optionally, after the passive focusing is enabled, and a lens is moved to a new position, go back and continue to perform a step of calculating the M pieces of first depth information, and then continue to perform steps subsequently in a sequence of the flowchart. This cycle is repeated in this way until focusing succeeds.

Figure 4:
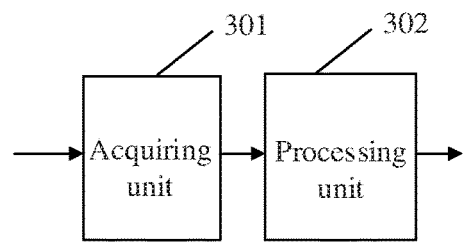
FIG. 4 is a functional block diagram of an auto-focus apparatus according to an embodiment of this application.

Based on a same inventive concept, an embodiment of this application further provides an auto-focus apparatus. Referring to FIG. 4, FIG. 4 is a functional block diagram of the auto-focus apparatus. A term involved in this embodiment is the same as or similar to the foregoing term. The apparatus includes an acquiring unit 301 configured to obtain a first image of a first object and collected using a first image shooting unit, and a second image of the first object and collected using a second image shooting unit, where the first image and the second image are collected at a same moment, and a processing unit 302 configured to calculate M pieces of first depth information of M same feature point pairs in corresponding areas in the first image and the second image, where M is a positive integer, determine whether confidence of the M pieces of first depth information is greater than a threshold, obtain focusing depth information according to N pieces of first depth information in the M pieces of first depth information when the confidence of the M pieces of first depth information is greater than the threshold, where N is a positive integer less than or equal to M, and obtain a target position of a first lens of the first image shooting unit according to the focusing depth information, and control the first lens to move to the target position.

Optionally, the corresponding areas correspond to positions of focus windows when the first image and the second image are collected, an area in the first image is a first area, an area in the second image is a second area, and the processing unit 302 is further configured to determine whether a quantity of first feature points in the first area is greater than or equal to a first threshold or determine whether a quantity of second feature points in the second area is greater than or equal to a second threshold, and determine that the confidence of the M pieces of first depth information is less than or equal to the threshold when the quantity of first feature points is less than the first threshold and/or the quantity of second feature points is less than the second threshold.

The processing unit 302 is further configured to search, for the first feature points, the second feature points in a first sequence for first matching feature points that match the first feature points, and search the second feature points in a second sequence for second matching feature points that match the first feature points when the quantity of first feature points is greater than or equal to the first threshold and the quantity of second feature points is greater than or equal to the second threshold, where the second sequence is reverse to the first sequence, determine a quantity of same matching feature points that are in the first matching feature points and the second matching feature points and corresponding to a same feature point in the first feature points, and determine that the confidence of the M pieces of first depth information is less than or equal to the threshold when a proportion of the quantity to the quantity of first feature points is less than a third threshold, or determine that the confidence of the M pieces of first depth information is greater than the threshold when a proportion of the quantity to the quantity of first feature points is greater than or equal to a third threshold.

The processing unit 302 is further configured to obtain the focusing depth information according to depth information corresponding to the same feature point.

With reference to the foregoing embodiments, the processing unit 302 is further configured to control a second lens of the second image shooting unit to move to a third position after controlling the first lens to move to the target position, determine that a check on the focusing depth information succeeds when a first contrast of an image obtained before the first lens moves to the target position and in a focus window area is less than a second contrast of an image obtained when the first lens is at the target position and in a focus window area, and a third contrast of an image obtained when the second lens is at the third position and in a focus window area is less than the second contrast, and control performing image shooting at the target position.

With reference to the foregoing embodiments, the processing unit 302 is further configured to determine that a check on the focusing depth information is successful before controlling the first lens to move to the target position.

The processing unit 302 is further configured to estimate an estimated distance between a human face and the first lens according to a size of a human face frame when the human face is detected in the focus window, and determine that the check on the focusing depth information is successful when an absolute value of a difference between the estimated distance and the focusing depth information is less than or equal to a fourth threshold.

With reference to the foregoing embodiments, the processing unit 302 is further configured to control the first lens and the second lens of the second image shooting unit to move to new positions when the confidence of the M pieces of first depth information is less than or equal to the threshold or the check fails.

The acquiring unit 301 is further configured to obtain, at the new positions, a third image and a fourth image of the first object and collected at a same time respectively using the first image shooting unit and the second image shooting unit.

The processing unit 302 is further configured to calculate P pieces of second depth information of N same feature point pairs in corresponding areas in the third image and the fourth image, where P is a positive integer, determine whether confidence of the P pieces of second depth information is greater than the threshold, obtain new focusing depth information according to L pieces of second depth information in the P pieces of second depth information when the confidence of the P pieces of second depth information is greater than the threshold, where L is a positive integer less than or equal to P, obtain a new target position of the first lens according to the new focusing depth information, and control the first lens to move to the new target position.

With reference to the foregoing embodiments, the processing unit 302 is further configured to control a second lens of the second image shooting unit to move to a position corresponding to the target position when controlling the first lens to move to the target position.

Various types of variations and specific examples in the auto-focus method in the foregoing embodiments in FIG. 1 to FIG. 3 are also applicable to the auto-focus apparatus in this embodiment. With the detailed description of the foregoing auto-focus method, persons skilled in the art may clearly understand an implementation method of the auto-focus apparatus in this embodiment. Therefore, for conciseness of the specification, details are not described herein again.

Figure 5:
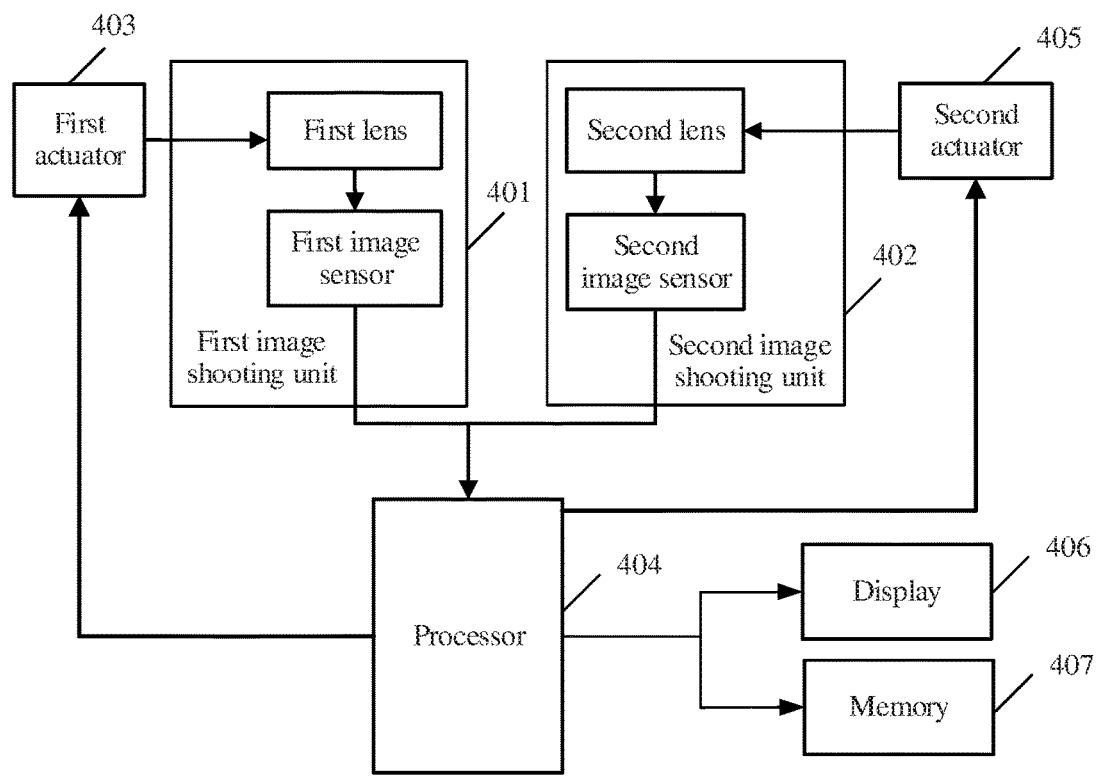
FIG. 5 is a system block diagram of an electronic device according to an embodiment of this application.

Based on a same inventive concept, an embodiment of this application further provides an electronic device. Referring to FIG. 5, FIG. 5 is a system block diagram of the electronic device in this embodiment. A term involved in this embodiment is the same as or similar to the foregoing term.

The electronic device includes a first image shooting unit 401 and a second image shooting unit 402 configured to respectively collect, at a same moment, a first image and a second image of a first object, a first actuator 403, and a processor 404 configured to calculate M pieces of first depth information of M same feature point pairs in corresponding areas in the first image and the second image, where M is a positive integer, determine whether confidence of the M pieces of first depth information is greater than a threshold, obtain focusing depth information according to N pieces of first depth information in the M pieces of first depth information when the confidence of the M pieces of first depth information is greater than the threshold, where N is a positive integer less than or equal to M, obtain a target position of a first lens of the first image shooting unit 401 according to the focusing depth information, and control the first actuator 403 to move such that the first lens moves to the target position.

Further, the first image shooting unit 401 includes the first lens and a first image sensor. The first image sensor is, for example, a CCD or a CMOS. The second image shooting unit 402 includes a second lens and a second image sensor.

Optionally, the first actuator 403 is a VCM.

Optionally, the corresponding areas correspond to positions of focus windows when the first image and the second image are collected, an area, in the first image is a first area, an area in the second image is a second area, and the processor 404 is further configured to determine whether a quantity of first feature points in the first area is greater than or equal to a first threshold or determine whether a quantity of second feature points in the second area is greater than or equal to a second threshold, and determine that the confidence of the M pieces of first depth information is less than or equal to the threshold when the quantity of first feature points is less than the first threshold and/or the quantity of second feature points is less than the second threshold.

The processor 404 is further configured to search, for the first feature points, the second feature points in a first sequence for first matching feature points that match the first feature points, and search the second feature points in a second sequence for second matching feature points that match the first feature points when the quantity of first feature points is greater than or equal to the first threshold and the quantity of second feature points is greater than or equal to the second threshold, where the second sequence is reverse to the first sequence, determine a quantity of same matching feature points in the first matching feature points and the second matching feature points and corresponding to a same feature point in the first feature points, and determine that the confidence of the M pieces of first depth information is less than or equal to the threshold when a proportion of the quantity to the quantity of first feature points is less than a third threshold, or determine that the confidence of the M pieces of first depth information is greater than the threshold when a proportion of the quantity to the quantity of first feature points is greater than or equal to a third threshold.

The processor 404 is further configured to obtain the focusing depth information according to depth information corresponding to the same feature point.

With reference to the foregoing embodiments, the electronic device further includes a second actuator 405, and the processor 404 is further configured to control the second actuator 405 to move in order to move the second lens of the second image shooting unit 402 to a third position after controlling the first lens to move to the target position, determine that a check on the focusing depth information succeeds when a first contrast of an image obtained before the first lens moves to the target position and in a focus window area is less than a second contrast of an image obtained when the first lens is at the target position and in a focus window area, and a third contrast of an image obtained when the second lens is at the third position and in a focus window area is less than the second contrast, and control performing image shooting at the target position.

Optionally, the second actuator 405 may be the same as or may be different from the first actuator 403.

With reference to the foregoing embodiments, the processor 404 is further configured to determine that a check on the focusing depth information is successful before controlling the first lens to move to the target position.

The processor 404 is further configured to estimate an estimated distance between a human face and the first lens according to a size of a human face frame when the human face is detected in the focus window, and determine that the check on the focusing depth information is successful when an absolute value of a difference between the estimated distance and the focusing depth information is less than or equal to a fourth threshold.

With reference to the foregoing embodiments, the processor 404 is further configured to control the first lens and the second lens of the second image shooting unit 402 to move to new positions when the confidence of the M pieces of first depth information is less than or equal to the threshold or the check fails, and at the new positions, a third image and a fourth image of the first object and collected at a same time using the first image shooting unit 401 and the second image shooting unit 402.

The processor 404 is further configured to calculate P pieces of second depth information of N same feature point pairs in corresponding areas in the third image and the fourth image, where P is a positive integer, determine whether confidence of the P pieces of second depth information is greater than the threshold, obtain new focusing depth information according to L pieces of second depth information in the P pieces of second depth information when the confidence of the P pieces of second depth information is greater than the threshold, where L is a positive integer less than or equal to P, obtain a new target position of the first lens according to the new focusing depth information, and control the first lens to move to the new target position.

With reference to the foregoing embodiments, the processor 404 is further configured to control a second lens of the second image shooting unit 402 to move to a position corresponding to the target position when controlling the first lens to move to the target position.

Continuing to refer to FIG. 5, the electronic device further includes a display 406 configured to display an image/images obtained by the first image shooting unit 401 and/or the second image shooting unit 402 or the processor 404.

Optionally, the electronic device further includes a memory 407 configured to store data that is used when the processor 404 performs an operation or temporary image data obtained by the first image shooting unit 401 and/or the second image shooting unit 402.

Optionally, the processor 404 may further include a central processing unit (CPU) and an ISP.

Optionally, the processor 404 is a CPU and is a chip that is mutually independent of an ISP physically.

Optionally, the electronic device further includes a battery configured to supply power to the electronic device.

Various types of variations and specific examples in the auto-focus method in the foregoing embodiments in FIG. 1 to FIG. 3 are also applicable to the electronic device in this embodiment. With the detailed description of the foregoing auto-focus method, persons skilled in the art may clearly understand an implementation method of the electronic device in this embodiment. Therefore, for conciseness of the specification, details are not described herein again.

One or more technical solutions provided in the embodiments of this application have at least the following technical effects or advantages.

In the embodiments of this application, at a same moment, a first image of a first object is collected using a first image shooting unit, and a second image of the first object is collected using a second image shooting unit, M pieces of first depth information of M same feature point pairs in corresponding areas in the first image and the second image are calculated, it is determined whether confidence of the M pieces of first depth information is greater than a threshold. A target position of a first lens is calculated according to the M pieces of first depth information, and the first lens is controlled to move to the target position when the confidence of the M pieces of first depth information is greater than the threshold. Therefore, in the embodiments, confidence of an object distance obtained in active focusing, that is, the M pieces of first depth information is determined. An active focusing method is used only when the confidence is greater than the threshold, that is, the target position of the first lens is obtained according to N pieces of first depth information in the M pieces of first depth information, and then the first lens is controlled to move to a current position to complete focusing. Therefore, in comparison with an active focusing method in other approaches, focusing precision is improved.

Persons skilled in the art should understand that the embodiments of this application may be provided as method and device embodiments and may be implemented in a hardware or combination of software and hardware manner.

This application is described with reference to the flowcharts or block diagrams of the method, the device (system), and the computer program product according to the embodiments of this application. It should be understood that computer program instructions may be used to implement each process or each block in the flowcharts or the block diagrams and a combination of a process or a block in the flowcharts or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts or in one or more blocks in the block diagrams.

These computer program instructions may be stored in a computer-readable memory that can instruct the computer or any other programmable data processing device such that the instructions stored in the computer-readable memory generate an artifact that includes an instruction apparatus. The instruction apparatus implements a specific function in one or more processes in the flowcharts or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts or in one or more blocks in the block diagrams.

Obviously, persons skilled in the art can make various modifications and variations to this application without departing from the spirit and scope of this application. This application is intended to cover these modifications and variations provided that they fall within the scope of protection defined by the following claims and their equivalent technologies.

What is claimed is:

1. An auto-focus method, comprising:
   collecting a first image of a first object using a first camera including a first lens, the first image collected with the first lens at a first position:
   collecting a second image of the first object using a second camera including a second lens, the second image collected with the second lens at a second position:
   obtaining focusing depth information of the first image and the second image; obtaining a target position of the first lens of the first camera according to the focusing depth information;
   controlling the first lens to move to the target position;
   controlling the second lens of the second camera to move to a third position;
   collecting a third image of the first object using the first camera when the first lens is at the target position;
   performing a check on the focusing depth information based on the first image, the third image, and a fourth image collected by the second camera with the second lens at the third position; and
   collecting a fifth image of the first object using the first camera with the lens at the target position when the check is successful.

2. The method of claim 1, further comprising controlling the second lens of the second camera to move to a position corresponding to the target position.

3. The method of claim 1, further comprising shooting an image in response to a user operation.

4. The method of claim 1, wherein an optical axis of the first camera is parallel to an optical axis of the second camera.

5. The method of claim 1, wherein the first object is a face.

6. An electronic device, comprising:
   a first camera having a first lens;
   a second camera having a second lens, the first camera and the second camera being disposed on a same plane of the electronic device;
   a first actuator; and
   a processor coupled to the first camera, the second camera, and the first actuator, the processor configured to:
      cause the first camera to collect a first image of a first object when the first lens is at a first position;
      cause the second camera to collect a second image of the first object when the second lens is at a second position;
      obtain focusing depth information of the first image and the second image;
      obtain a target position of the first lens of the first camera according to the focusing depth information;
      control the first actuator to move the first lens to the target position;
      control movement of the second lens to move the second lens to a third position;
      cause the first camera to collect a third image of the first object when the first lens is at the target position;
      perform a check on the focusing depth information based on the first image, the third image, and a fourth image collected by the second camera with the second lens at the third position; and cause the first camera to collect a fifth image of the first object using the first camera with the lens at the target position when the check is successful.

7. The electronic device of claim 6, wherein the first camera and the second camera are disposed on a rear cover of the electronic device.

8. The electronic device of claim 6, wherein a parameter of the first camera is the same as a parameter of the second camera.

9. The electronic device of claim 8, wherein the first camera and the second camera have a same focal length.

10. The electronic device of claim 6, wherein an optical axis of the first camera is parallel to an optical axis of the second camera.

11. The electronic device of claim 6, wherein the first actuator is a voice coil motor (VCM).

12. The electronic device of claim 7, wherein the voice coil motor (VCM) comprises:
   a magnet set; and
   a coil fixed in the magnet set using two spring plates, the coil configured to generate a magnetic field when the coil is powered on, the magnetic field interacting with the magnet set to move the coil upward, the first lens being locked in the coil such that the coil and the first lens move together, and the coil configured to return back to an original position under an elastic force of the spring plate when the coil is powered off.

13. The electronic device of claim 6, wherein the electronic device is a mobile phone.

14. The method of claim 1, further comprising determining a first contrast of the first image, a second contrast of the second image, and a third contrast of the fourth image.

15. The method of claim 14, wherein the performing the check includes determining whether the third contrast is less than the second contrast.

16. The method of claim 15, wherein performing the check further includes determining whether the first contrast is less than the second contrast.

17. The method of claim 16, further comprising determining that the check is successful when the third contrast is less than the second contrast and the first contrast is less than the second contrast.

* * * * *

UNITED STATES PATENT AND TRADEMARK OFFICE
CERTIFICATE OF CORRECTION

PATENT NO. : 10,455,141 B2  
APPLICATION NO. : 16/142996  
DATED : October 22, 2019  
INVENTOR(S) : Cheng Du et al.

Page 1 of 1

It is certified that error appears in the above-identified patent and that said Letters Patent is hereby corrected as shown below:

On the Title Page

(57) Abstract, Line 10: "in the IM pieces" should read "in the M pieces"

In the Claims

Claim 1, Column 22, Line 17: "position:" should read "position;"

Signed and Sealed this  
Seventeenth Day of December, 2019

Andrei Iancu  
*Director of the United States Patent and Trademark Office*